US005671905A

United States Patent [19]
Hopkins, Jr.

[11] Patent Number: 5,671,905

[45] Date of Patent: Sep. 30, 1997

[54] ELECTROCHEMICAL ACTUATOR AND METHOD OF MAKING SAME

[76] Inventor: Dean A. Hopkins, Jr., 765 Regent Park Dr., San Jose, Calif. 95123-1332

[21] Appl. No.: 493,278

[22] Filed: Jun. 21, 1995

[51] Int. Cl.[6] .............................. F16K 31/02; F03C 5/00

[52] U.S. Cl. .......................... 251/129.01; 60/516; 60/531

[58] Field of Search .............................. 251/61.1, 129.01, 251/129.06, 331; 60/516, 530, 531

[56] References Cited

U.S. PATENT DOCUMENTS

| | | | |
|---|---|---|---|
| 3,168,805 | 2/1965 | Fleury | 60/531 |
| 3,256,686 | 6/1966 | Lindberg | 60/516 |
| 3,739,573 | 6/1973 | Giner | 50/516 |
| 3,802,462 | 4/1974 | Trosch | 251/61.1 X |
| 4,170,878 | 10/1979 | Jahnig | 60/516 X |
| 4,543,788 | 10/1985 | Urzay | 60/531 |
| 5,197,192 | 3/1993 | Wylie et al. | 251/61.1 X |
| 5,210,817 | 5/1993 | Naruse et al. | 385/147 |
| 5,268,082 | 12/1993 | Oguro et al. | 204/282 |
| 5,322,258 | 6/1994 | Bosch et al. | 251/129.01 X |
| 5,325,880 | 7/1994 | Johnson et al. | 137/1 |
| 5,344,117 | 9/1994 | Trah et al. | 251/11 |
| 5,367,878 | 11/1994 | Muntz et al. | 60/516 X |

OTHER PUBLICATIONS

Hamberg, M. W. et al., An Electrochemical Actuator, 1995, IEEE pp. 106–110.

Barth, P. W., Silicon Microvalves for Gas Flow Control, Jun. 25, 1995, Transducers '95 The 8th Inernational Conference on Solid-State Sensors and Actuators, pp. 276–279.

TCAM Technologies, Inc. Thermo chemical actuator, advertisement, Machine Design Magazine, Aug. 10, 1995.

Schubert, F.H. et al., Generating High Pressure Oxygen Electrolytically, Aug. 1994, NASA Tech Briefs, p. 56.

*Primary Examiner*—Hoang Nguyen

*Attorney, Agent, or Firm*—Richard D. Clarke

[57] ABSTRACT

A new and improved electrochemical actuator and method of using it enables a reversible electrochemical generation of gases for inducing a phase/volume change that can produce high actuation forces, long actuation distances, and remain at the last pressure level attained by current flow even after the power is switched off, enabling a zero power hold at any position. The electrochemical actuator includes an electrolyte solution sealed within a substantially constant volume chamber, having electrical contacts disposed therein such that the electrolyte is in electrical communication with the electrical contacts. Passage of current between the contacts through the electrolyte, separates the electrolyte and or electrode material into its component gas or gases, resulting in an increased pressure within the chamber. This pressure can either act directly upon, or be routed via pneumatic or hydraulic lines, to actuate a diaphragm, move a piston, inflate a bladder, or any other suitable means of converting pressure to motion or displacement. The electrochemical actuator of the present invention can be scaled-up for large scale applications, or down-scaled for micro-miniaturization applications. Because of its low voltage and current requirements, the present electrochemical actuator is fully compatible with modern semiconductor circuits. Furthermore, the electrochemical actuator of the present invention can be operated over a wide temperature range and inexpensively manufactured in large quantities.

16 Claims, 2 Drawing Sheets

ELECTROCHEMICAL ACTUATOR AND METHOD OF MAKING SAME

BACKGROUND OF THE INVENTION

1. Field of the Invention

The present invention relates to an electrochemical actuator and method for making same. More particularly, the present invention relates to an electrochemical actuator assembly and a new and improved method for making it, for using electrochemically generated gases in pneumatic actuation operations.

2. Description of the Related Art

Today's modern actuator technology has resulted in many different types of devices and methods for achieving mechanical actuation. Examples of different types and kinds of arrangements and techniques for utilizing micro-actuators and macro-actuators are disclosed in U.S. Pat. Nos. 5,210,817, 5,268,082, 5,325,880, and 5,344,117 all of which are incorporated herein by reference.

In general, the structure and function of most actuators are based on one or more of the following technologies: electromagnetic actuation, magnetostrictive actuation, piezoelectric actuation, electrostatic actuation, and electrothermal actuation. The class of electrothermal actuation includes such technology developments as sealed capsule expansion actuators, dual layer bimorph actuators, shape memory alloy actuators, and pneumatic actuators.

Electromagnetic actuation devices and method are well known in the art of actuation. This is one of the classic methods of choice for converting electrical energy to motion or displacement. The typical embodiment consists of a coil of wire forming a solenoid. The solenoid generates a magnetic field proportional to the current flow and the number of turns in the coil. The magnetic field interacts with a high permeability core to produce a magnetic field strong enough to move the core, or attract or repel an additional magnet or ferromagnetic coupling. The resulting force then moves a diaphragm, opens or closes switch contacts, or mechanically steps a structure. This force also falls off exponentially with distance.

Electromagnetic actuation is fast (10's of milliseconds), provides relatively high actuation forces, is highly reliable (normally greater than 1,000,000 cycles), capable of operation within a relatively high temperature range, and is well understood in the art of actuation.

However, electromagnetic actuation requires very high currents, large numbers of bulky and heavy turns, and a large mass of high permeability material for a core. As a result, it is difficult to scale an electromagnetic actuator to a small size while maintaining a high actuation force. Moreover, electromagnetic actuators are power hungry, requiring continual power or mechanical latching to maintain position.

Therefore, it would be highly desirable to have a new and improved device and method for actuation that was capable of micro-miniaturization, utilized very low power inputs, and generated a maintainable high force even when power input was discontinued.

Magnetostrictive actuation was developed from electromagnetic actuation. Conventional magnetostrictive actuator configurations include multiple solenoid coils on a single shaft or armature, which generate magnetic fields that "pinch" the shaft, making it narrower and longer. By providing close spacing between the shaft and a housing, the magnetic fields can be "rippled" down the shaft, causing it to move in a "caterpillar-like" fashion.

Magnetostrictive actuation is capable of small and precise high force displacements that can be held in position by friction between the shaft and housing.

However, like electromagnetic actuation devices, magnetostrictive actuators require high current, large numbers of bulky and heavy turns, and a large mass of magnetostrictive material. Moreover, due to the precision fit required between the shaft and the housing, it is difficult to scale a magnetostrictive actuator to small size. Furthermore, because of the "creeping" actuation motion achieved, magnetostrictive actuation tends to be slow.

Therefore, it would be highly desirable to have a new and improved actuator, and method of using it, that utilizes low currents, was capable of micro-miniaturization, and that displayed very rapid actuation times.

Piezoelectric actuation takes advantage of certain crystalline materials which have the property of expanding or contracting under an electrostatic field. For example, quartz is commonly used in piezoelectric actuator applications. In practice, a crystal has electrodes placed on two opposite faces, and this "sandwich" is used to provide force. Piezoelectric actuation is capable of providing high force displacements with relatively small amounts of applied power.

However, a single crystal provides minuscule travel distance. To increase the stroke, multiple crystals are usually stacked, adding greatly to manufacturing assembly and materials costs. Although piezoelectric actuation requires very low current, relatively high voltages are required, and as such, piezoelectric actuation is not always compatible with modern semiconductor circuits. Moreover, piezoelectric actuators are difficult to micro-miniaturize because of the necessity of assembling stacks of materials with differing expansion coefficients, and the precise clearances required by the limited travel.

Therefore, it would be highly desirable to have a new and improved actuator technology that has the characteristics of being readily micro-miniaturized, utilizes low voltages to achieve high force displacements, is compatible with modern semiconductor circuits, and is capable of being efficiently and inexpensively manufactured in large quantities.

Electrostatic actuation techniques rely upon the well known principle that like charges repel and opposite charges attract. With electrostatic actuator devices, displacement force is proportional to the surface area of capacitor plates, and applied voltage, and is inversely proportional to the square of the gap distance. Electrostatic actuators are capable of providing fast displacements with minimal applied power.

However, because of the sensitivity to gap width, displacement is limited, for practical purposes, to a few microns. This narrow gap is sensitive to contamination of particles, and the high electric fields generated within the gap tend to attract and hold particles there. As a result of contamination, proper actuation is prevented. Although actuation does not require high currents, it does require high voltages, and as such is not always compatible with modern semiconductor circuits. Moreover, to obtain significant force requires large capacitor plates.

Therefore, it would be highly desirable to have a new and improved actuator and method of using it, that is substantially immune to particle contamination, could be readily micro-miniaturized, utilizes low voltages, and as such is compatible with modern semiconductor circuits.

As previously mentioned, electrothermal actuation devices are primarily made up of sealed capsule expansion actuators, dual layer bimorph actuators, shape memory alloy actuators, and pneumatic actuators.

Sealed capsule expansion actuator technology utilizes a sealed chamber with a heater element and a working fluid. Thermally driven phase change causes pressure within the chamber to markedly rise with applied heat. In effect, this device essentially resembles a scaled down Newcomen steam engine.

Sealed capsule expansion produces high forces, and is capable of rapid actuation. Actuation threshold temperature is set by the working fluid. Lower boiling point fluids require less power for actuation, but limit the useful temperature range greatly.

However, sealed capsule expansion actuators suffer from slow turn off times, as influenced greatly by the thermal masses and conductivities of the actuator materials, and the ambient temperature. Current embodiments have problems with the seals not being fully compatible with the working fluid. These incompatible seals have a tendency to leak. Moreover, the sealed capsule expansion actuator technology is power hungry as it requires a fluid to be maintained at its boiling point, while also requiring good heat sinking for rapid turn off.

Therefore, it would be highly desirable to have a new and improved actuator device and method of using it, that produces high forces, is capable of rapid actuation in a wide range of temperatures, is incapable of leaking a working fluid, and utilizes low input power in an efficient and cost effective manner.

Dual layer bimorph actuators use differential expansion of materials to produce displacement. Perhaps the most familiar application of dual layer bimorph actuators is in HVAC thermostats where a bimorph coil opens or closes contacts when a set temperature is reached. Dual layer bimorph actuators are capable of high forces and displacements. They are relatively fast, having actuation times on the order of 100 milliseconds.

However, like all thermally actuated technologies, dual layer bimorph actuators suffer from slow turn off times, limited by the thermal masses and conductivities of the actuator materials, and the ambient temperature. Dual layer bimorph actuators also tend to be power hungry due to the need to maintain a temperature above the switch point, while at the same time requiring good heat sinking for rapid shutoff. Moreover, down scaling is difficult with dual layer bimorph actuators, as micro-machined devices are limited in actuation distance and force. Current dual layer bimorph actuator valve designs trade off either poor media isolation for relatively long travel distances, or good media isolation for short travel distances.

Therefore, it would be highly desirable to have a new and improved actuator and method of using same which is readily micro-miniaturized, display rapid turn off times at a wide range of temperatures, utilize minimum power input to function, and exhibit good media isolation together with relatively long travel distances.

Shape memory alloy actuators are a recent actuation technology breakthrough. Shape memory alloy is a mixture of, most commonly, nickel and titanium, which changes crystalline state as a function of temperature. At low temperature the material is in a flexible martensitic state. As it is heated, the material then reverts to a "super elastic" austenitic structure, and regains its original annealed-in austenitic dimensions.

This shape memory alloy actuator is capable of producing high forces. In the austenitic state, the material is "super-elastic", and can recover as much as three percent, allowing high actuation distance. Rapid turn on can be achieved as the material is directly heated by current flow.

However, like all thermally actuated configurations, shape memory alloy actuators suffer from slow turn off times, which are limited by the thermal masses and conductivities of the actuator materials, and the ambient temperature. Also, shape memory alloy actuators tend to be power hungry due to the need to maintain a temperature above the switch point, while at the same time requiring good heat sinking for rapid shutoff. Although this disadvantage can be somewhat offset by miniaturization and the low thermal mass of thin film actuator elements, current valve designs, as illustrated in U.S. Pat. No. 5,325,880 exhibit poor media isolation.

Therefore, it would be highly desirable to have a new and improved actuator device and method of using it that exhibited rapid actuation and turn off times within a wide range of temperatures, utilized low power input, and that produces consistently high actuation forces over a relatively long actuation distance with excellent media isolation.

Pneumatic actuators are common today in many industrial applications. With conventional pneumatic actuators, a pressure source is created by mechanical pumps driven by internal combustion, steam turbine, or electric motors. Small solenoid pilot valves shunt pressure to control larger diaphragm valves, rams, or hydraulic motors and the like.

However, pneumatic actuators have several disadvantages. First, they require a compressed air source. Air compressors are noisy and inherently power hungry. If the system is run from a compressed air tank, the useful life is limited. Secondly, pneumatic lines are bulky and prone to kinking or leaking. Leaks or kinks, or loss of pressure to the system results in valves relaxing to the off position. Finally, perhaps the greatest limitation of pneumatic actuators is that pneumatic valves do not directly convert an electrical signal into movement. To accomplish motion, an electrically operated pilot valve is required, significantly adding to the overall complexity of the system.

Therefore it would be highly desirable to have a new and improved actuator assembly and method for fabricating same, that enables micro-miniaturization, is capable of being efficiently and inexpensively mass manufactured, utilizes low voltage and current to actuate, is acoustically quiet, maintains the last setting even in the absence of power, is light in weight, has fast actuation times, generates high actuation forces and long travel distances, has a wide storage and operating temperature range, wide choice of media contact materials, and is orientation insensitive.

SUMMARY OF THE INVENTION

Therefore, the principal object of the present invention is to provide a new and improved actuator assembly and method to enable using electrochemical generation of gases for pneumatic actuation, with such an actuator utilizing minimal voltage to produce very rapid actuation times, rapid turn off times, high force generation, long travel distances, and maintainable force even when the power is switched off, operating effectively and efficiently in a wide temperature range.

It is a further object of the present invention to provide such a new and improved actuator assembly and method that is readily micro-miniaturized, compatible with modern semiconductor circuits, tolerant of particle contamination and hermetically sealed against working fluid leakage, and displays good media isolation while being efficiently and inexpensively manufactured.

Briefly, the above and further objects of the present invention are realized by providing a new and improved electrochemical actuator and method of using it to enable a reversible electrochemical generation of gases for inducing a phase/volume change that can produce high actuation forces, long actuation distances, and remain at the last pressure level attained by current flow even after the power is switched off, enabling a zero power hold at any position. The electrochemical actuator includes an electrolyte solution sealed within a substantially constant volume chamber, having electrical contacts disposed therein such that the electrolyte is in electrical communication with the electrical contacts. Passage of current between the contacts through the electrolyte, separates the electrolyte into its component gases, and or extracts gases from an electrode material, resulting in an increased pressure within the chamber. This pressure can either act directly upon, or be routed via pneumatic or hydraulic lines, to actuate a diaphragm, move a piston, inflate a bladder, or any other suitable means of converting pressure to motion or displacement. The electrochemical actuator of the present invention can be scaled-up for large scale applications, or down-scaled for micro-miniaturization applications. Because of its low power requirements, the present electrochemical actuator is fully compatible with modern semiconductor circuits. Furthermore, the electrochemical actuator of the present invention can be operated over a wide temperature range, limited only by the freezing and boiling points of the electrolyte employed, and can be readily and relatively inexpensively manufactured in large quantities.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

DESCRIPTION OF THE PREFERRED EMBODIMENTS

Figure 1:
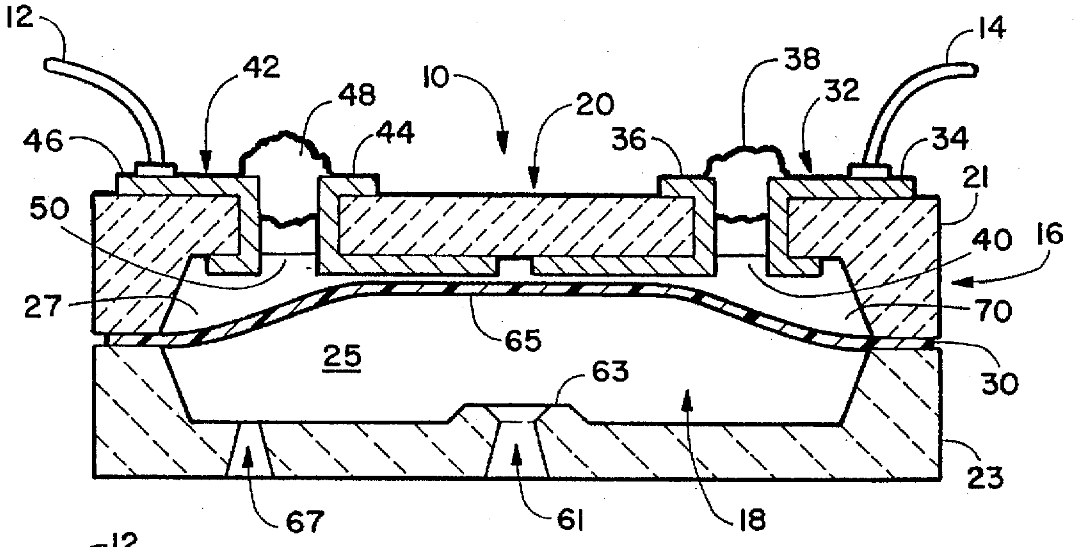
FIG. 1 is a cross-sectional side view illustrating an electrochemical actuator valve mechanism, in the 100% open position, constructed in accordance with the present invention.
Figure 2:
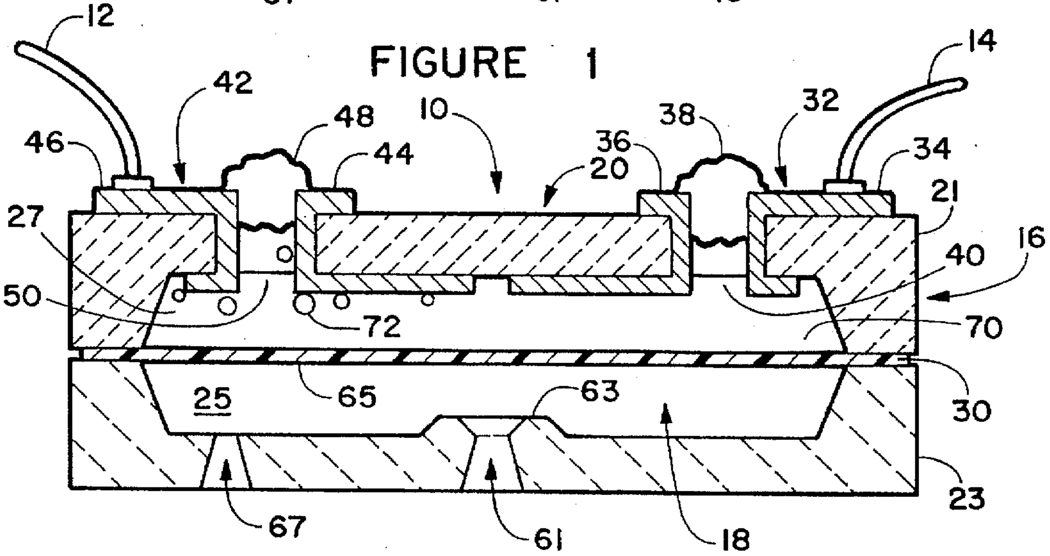
FIG. 2 is a cross-sectional side view of the electrochemical actuator valve mechanism of FIG. 1, shown in the 50% open position.
Figure 3:
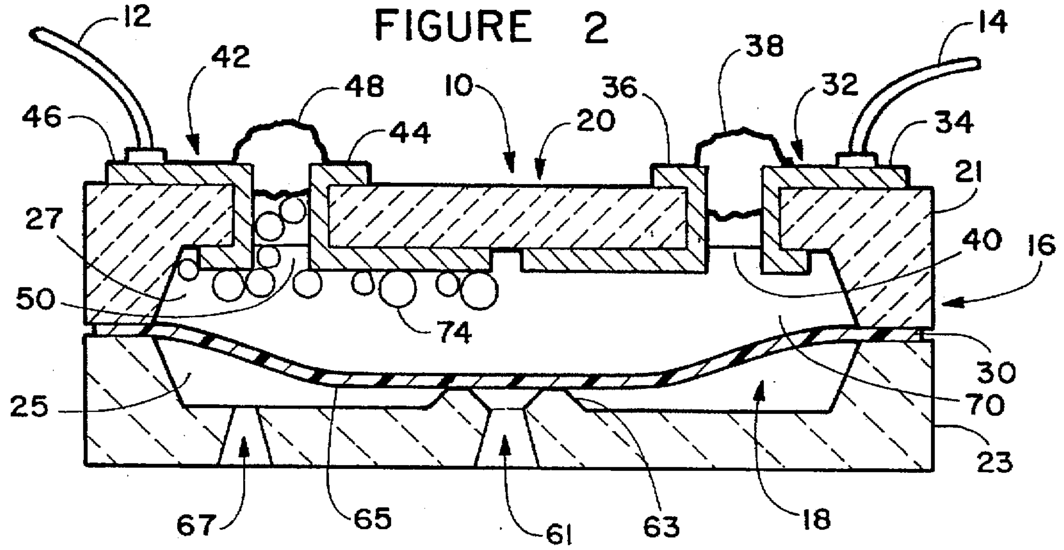
FIG. 3 is a cross-sectional side view of the electrochemical actuator valve mechanism of FIG. 1, shown in the closed position.

Referring now to the drawings, and more particularly to FIGS. 1–3 thereof, there is shown a new electrochemical actuator valve mechanism 10, which is constructed in accordance with the present invention. The electrochemical actuator valve mechanism 10 is connected to a power source (not shown) via leads 12 and 14. Because the electrochemical actuator valve 10 requires low voltage and current, the connected power source may be controlled by modern conventional semiconductor devices.

The electrochemical actuator valve mechanism 10 generally includes a housing 16 defining an interior chamber 18. The housing 16 has an upper housing member 21 and a lower housing member 23. The interior chamber 18 is divided into a lower portion 25 and an upper portion 27 by a diaphragm 30. The diaphragm 30 is sandwiched between, and bonded to, the housing upper member 21 and lower member 23 during manufacture, or it should be understood by one with ordinary skill in the art, that the diaphragm 30 may be integrally connected to the housing 16.

An electrode 32, including a right electrode element 34 and a left electrode element 36, is connected in electrical communication to the lead 12 and extends from the outer top surface 20 of the upper housing member 21 to the interior chamber upper portion 27. A seal member 38 composed of an electrically conductive material, spans a gap 40 connecting the right electrode element 34 and left electrode element 36 in electrical communication.

Alternatively, electrode 32 may be of unitary construction, defining gap 40, which acts as a fill hole for the introduction of electrolyte materials into interior chamber upper portion 27. When this is the case, the fill holes are preferably sealed by being electroplated closed.

Likewise, another electrode 42, including a right electrode element 44 and a left electrode element 46, is connected in electrical communication to the lead 14 and extends from the outer top surface 20 of the upper housing member 21 to the interior chamber upper portion 27. A seal member 48 composed of an electrically conductive material, spans a gap 50 connecting the right electrode element 44 and left electrode element 46 in electrical communication.

Similarly, electrode 42 may be constructed in one piece, defining gap 50, which acts as a fill hole for the introduction of electrolyte materials into interior chamber upper portion 27.

Centrally disposed on lower housing member 21 is an inlet opening 61, enabling fluid communication between the outside environment and the interior chamber lower portion 25. The lower housing member 21 is constructed in such a way as to have a raised portion surrounding the inlet opening 61, which acts to form a valve seat 63. The valve seat 63 is complementarily shaped to the lower surface 65 of diaphragm 30, such that when diaphragm 30 is in contact with valve seat 63, the interior chamber lower portion 25 is effectively cut off from receiving any gas or liquid through inlet opening 61.

An outlet opening 67 is located some distance from the inlet opening 61. Unlike the inlet opening 61, the outlet opening 67 creates constant fluid communication between the outside environment and the interior chamber lower portion 25.

In operation, an electrolyte solution 70 is injected into the interior chamber upper portion 27. Seal members 38 and 48 are affixed to electrode elements 34 and 36, and 44 and 46, respectively. Seal members 38 and 48 effectively seal off the electrolyte solution 70 within interior chamber upper portion 27, creating a substantially constant volume, fluid filled chamber. In the case of unitary construction electrodes, the seal members are electroplated to the single piece electrodes.

During manufacture, care is taken not to trap air within the sealed chamber when closing off the fill hole or vent hole. Commonly, this is accomplished by plugging the fill or vent hole with a nonpermeable material, such as solder, or the like. This is most effectively accomplished by electroplating closed the fill hole or holes, and or vent hole or holes that are used to introduce or facilitate the introduction of liquids into the chamber. It should be understood by one of ordinary skill in the art that electroplating encompasses both electrochemical plating techniques as well as anodization techniques.

Care should also be taken in choosing an appropriate electrolyte. Proper electrolytes can be an aqueous solution, a non-aqueous solution, or a gel or semisolid containing one or more of the following: Acids or acidic salts, bases or basic salts, and neutral salts. Electrolytes suitable for this purpose include acids such as sulfuric, nitric, or other mineral acids, bases such as potassium hydroxide, sodium hydroxide, or other alkaline metal hydroxides, salts such as sodium chloride, potassium chloride, and potassium iodide, acids or bases buffered with appropriate salts, nitrates, sulfates, carbonates, or other oxygen containing substances, organic acids or bases, or any of the above solutions converted to a semi-solid state using polymers, proteins, starches, adsorbents or absorbents. The preferred electrolyte is aqueous tin sulfate.

Similarly, electrode materials will vary based on the application and electrolyte used. Commonly employed electrode materials include pure metals, such as lead, metal oxides, such as tin oxide, metal hydrides, such as nickel hydride, metal halides, such as mercuric chloride, and metal sulfates and sulfites. The preferred positive electrode material is metal oxides, hydrides or halides, whereas the preferred negative electrode materials are noble metals. When employed with the preferred electrolyte, tin sulfate, the preferred electrode materials are tin oxide for the anode, and gold for the cathode. One skilled in the art will understand that many electrolyte, positive electrode, and negative electrode combinations are possible.

Once the interior chamber upper portion 27 is filled with electrolyte solution 70 and adequately sealed, the electrochemical actuator is ready for use. The preferred method of sealing shut the fill holes used to introduce electrolyte solutions into the inner chamber is electrochemical plating or anodizing. Plated fill hole seal materials should be the same metal or material as the electrode to avoid unwanted galvanic corrosion and to insure compatibility of the plating solution.

In the 100% open configuration, shown in FIG. 1, the electrochemical actuator valve mechanism 10 has an electrolyte working fluid composed of 100% liquid.

A current is passed between the electrodes 32 and 42, causing a reaction at the anode 42 liberating gas, in the form of nascent gas bubbles 72, as best seen in FIG. 2. This liberated gas 72 increases the pressure within the sealed interior chamber upper portion 25, causing the diaphragm 30 to move toward the valve seat 63.

FIG. 2 shows the electrochemical actuator valve mechanism at the 50% open position. With diaphragm 30 in this position, substantially one-half of the flow through the interior chamber lower portion 25 is realized. When the current is turned off, the diaphragm 30 maintains its last position, enabling a zero power hold at any position. This feature allows direct control of the mechanical position of the diaphragm 30 for proportional control of physical parameters such as precision placement, flow metering or pumping.

At some point enough gas is generated to form large gas bubbles 74 causing the diaphragm 30 to contact the valve seat 63, effectively closing off the inlet opening and preventing flow of gases or liquids through the interior chamber lower portion 25. This 100% closed position of the electrochemical actuator valve mechanism is shown in FIG. 3.

Reversing the current causes the reverse reaction at the anode 42, converting the generated gas back into a liquid or solid and allowing the valve to open. Again, turning off the power at any point will enable a zero power hold of diaphragm 30 at any position.

The electrodes employed for electrochemical gas generation should be treated to increase the surface area to aid in retaining bubbles and increase reaction rates. Such treatments include, but are not limited to: anodizing, photolithography and etching, sintering, using mechanical deformation such as stamping, slitting and brushing, etching, amalgamation, plasma spraying, powdered materials application, physical vapor deposition, and chemical vapor deposition. Moreover, it is advantageous to employ electrodes which are permeable or semipermeable to the generated gas, in a reversible system.

The diaphragm 30 can be made of a variety of materials. It need not be composed of a magnetic or a rigid substance, however, it must be composed of a material that is gas impermeable. Examples of suitable compounds for diaphragm fabrication include: #316 stainless steel, TEFLON# brand fluorocarbons, or the equivalent, KAPTON# brand polyimides, or the equivalent, single crystal silicon, polycrystalline silicon, silicon nitride, silicon dioxide, and metalized MYLAR# brand plastic film, or other metalized plastic films. The preferred material for the diaphragm is TEFLON# coated metalized KAPTON# because of its flexibility, non-permeability and inertness.

Figure 4:
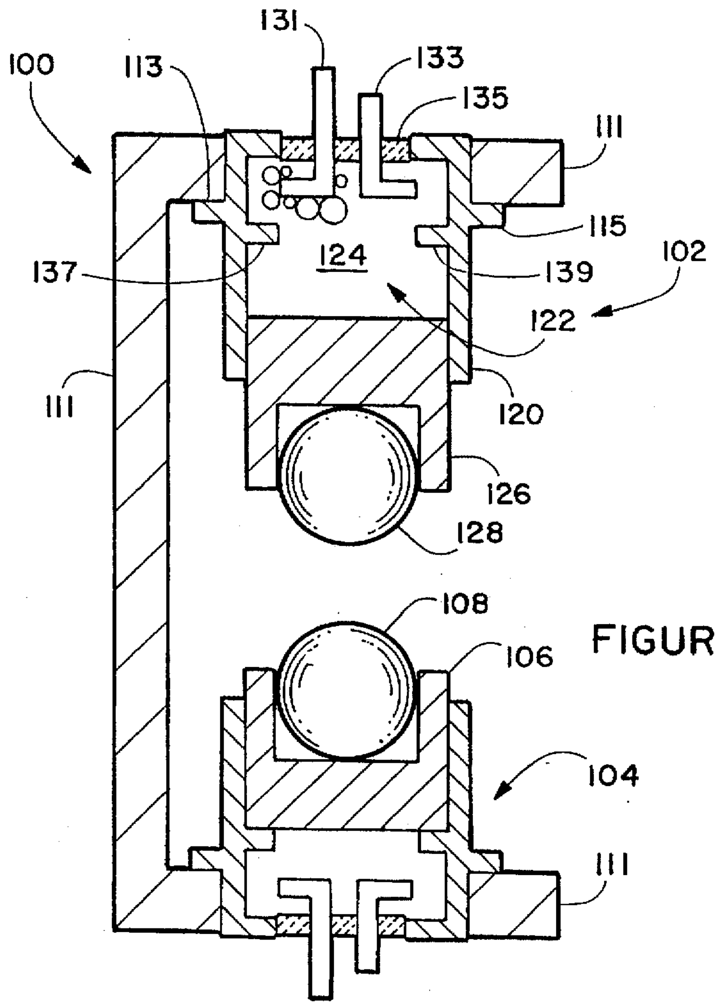
FIG. 4 is a cross-sectional side view of a push/pull electrochemical actuator, constructed in accordance with the present invention.

Referring now to FIG. 4, there is shown another electrochemical actuator assembly 100, which is constructed in accordance with the present invention, and which is similar to the electrochemical actuator valve mechanism 10, except that the electrochemical actuator assembly 100 is designed to work as a push/pull actuator. In this regard, the push/pull actuator assembly 100 could function in driving prosthetics, or rotary motion via a swash plate assembly, or the like.

The push/pull actuator assembly 100 consists of two opposed actuators 102 and 104, that are connected in such a fashion that as the first actuator 102 is extending, the second actuator 104 is retracting at the same rate. This allows an object, such as a swash plate (not shown), to be firmly grasped or pinched and precisely positioned. Alternatively, both actuators 102 and 104 could be retracted, then energized until the object is clamped or preloaded with a predetermined force.

Since both actuators 102 and 104, are substantially identical, only actuator 102 will be described in greater detail below. Actuator 102 is mounted on a frame 111 and held in place by stops 113 and 115, which are integrally connected to the actuator housing 120. Housing 120 defines an interior chamber 122 which contains an electrolyte 124. A moveable member, in the form of a piston 126 is slidably connected to and held at least partially within the housing 120. The piston 126 has a bearing 128 attached to it, for contacting or holding an object (not shown) to be held or positioned by the push/pull actuator assembly 100.

Extending through the housing 120 and contacting the electrolyte 124 are two electrodes 131 and 133. These electrodes are embedded in a seal material 135, such as glass, used both to hermetically seal the electrolyte 124 within the interior chamber 122, and to insulate the electrodes 131 and 133 from contacting the housing 120 material. Internal housing stops 137 and 139 prevent piston 126 from contacting the electrodes 131 and 133 when piston 126 is retracting back into the housing 120.

In operation, electrodes 131 and 133 are connected in electrical communication with a controlling power source (not shown). When current is allowed to flow between electrodes 131 and 133, gas is liberated at electrode 131 causing an increase in pressure within housing 120, which in turn causes the movement of piston 126 away from electrodes 131 and 133. Reversing the current causes the opposite effect, and piston 126 will retract. At any point of travel, piston 126 can be stopped by stopping the current flow, for a zero power hold in any position. The actuator is acoustically quiet and achieves very high force with minimal power application.

At the same time, current may be directed to a second actuator 104, to cause the second actuator piston 106 to extend or retract, depending on the application. Likewise, second actuator piston 106 may have a bearing 108, or the like, for grasping and holding an object, or positioning an object, in a coordinated fashion with first actuator 102.

Figure 5:
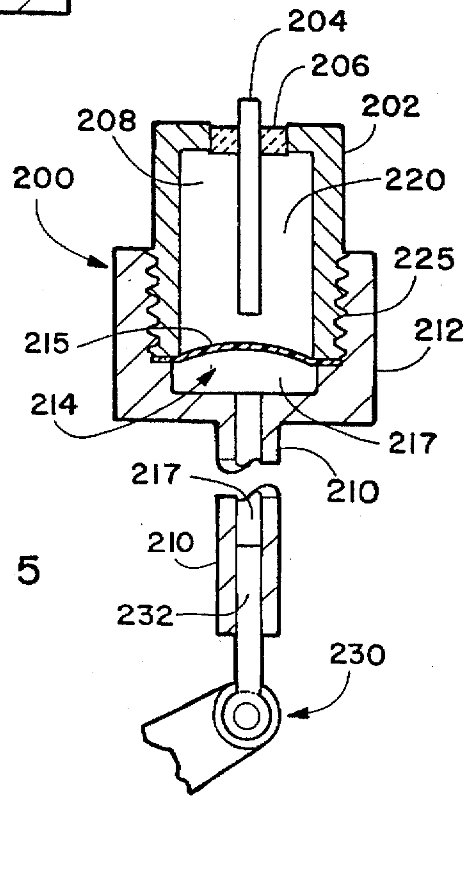
FIG. 5 is a cross-sectional partially fragmented side view of an electrochemical actuator insulated from extreme high/low temperature environments present invention.

Referring now to FIG. 5, there is shown another electrochemical actuator 200, which is constructed in accordance with the present invention, and which is similar to the electrochemical actuator valve mechanism 10, except that the electrochemical actuator 200 is designed to work within a wide temperature range, using a hydraulic line 210 to isolate the actuator from an environment where there exists high or low temperature extremes.

Electrochemical actuator 200 for remote high/low temperature actuation includes a threaded metal housing 202 and an anode 204 extending through an hermetic seal 206 and into an interior chamber 208 defined by the threaded housing 202. The interior chamber is filled with an electrolyte 220. A metal diaphragm 215 separates the electrolyte 220 within the interior chamber 208 and hydraulic fluid 217 within an hydraulic line 210. The threaded metal housing 202 acts as a cathode and is threaded into an hydraulic line coupling member 212 containing opposite threads 225, to properly seat the diaphragm 215 and effectively seal the hydraulic fluid 217 within a hydraulic line coupling reservoir 214.

Distal to the electrochemical actuator 200 is an actuated mechanical device 230 connected in fluid communication with hydraulic line 210. While the actuator 200 is located in a moderate temperature area, the actuated mechanical device 230 can be located in an extreme temperature area.

The actuated mechanical device is driven by a sealed piston 332 disposed at least partially within hydraulic line 210 and in direct contact with hydraulic fluid 217.

In operation, the anode 204 is coated with a conductive metal oxide. Current is directed between the anode and the threaded metal housing 202, which acts as a cathode. Gas is liberated which increases the pressure within the interior chamber 208, causing the diaphragm 215 to move away from the anode 204 and displace the hydraulic fluid 217 out of the hydraulic line coupling reservoir 214 and into the hydraulic line 210. This in turn, causes displacement of the sealed piston 232 causing actuation in the actuated mechanical device 230.

It should be understood, however, that even though these numerous characteristics and advantages of the invention have been set forth in the foregoing description, together with details of the structure and function of the invention, the disclosure is illustrative only, and changes may be made in detail, especially in matters of shape, size, chemistry and arrangement of parts within the principal of the invention to the full extent indicated by the broad general meaning of the terms in which the appended claims are expressed.

What is claimed is:

1. A micro-miniaturized electrochemical actuator, comprising:

a housing defining an interior chamber;

semi-solid electrolyte means hermetically sealed within said interior chamber for facilitating the conduction of current;

electrode means extending through said housing and at least partially into said interior chamber for contacting in electrical communication said electrolyte means;

digital semiconductor means for controlling the timing, duration, frequency and amount of current flowing to said electrode means; and moveable means disposed at least partially within said interior chamber for facilitating actuation, whereby when current is passed between said electrode means, as directed by said controlling means, a gas is liberated from said semi-solid electrolyte means increasing the pressure applied to said moveable means by said electrolyte means, and causing said moveable means to move.

2. An electrochemical actuator, according to claim 1, wherein said semi-solid electrolyte means includes a buffered acid, buffered base, or neutral salt substance.

3. An electrochemical actuator, according to claim 1, wherein said electrode means are composed of materials selected from the group consisting of noble metals, metal oxides, and metal halides.

4. An electrochemical actuator, according to claim 3, wherein said electrode means are composed of gold and tin oxide.

5. An electrochemical actuator, according to claim 1, wherein said controlling means includes digital microprocessor semiconductor circuits.

6. An electrochemical actuator, according to claim 1, wherein said moveable means includes a diaphragm.

7. An electrochemical actuator, according to claim 1, wherein said moveable means includes a piston.

8. An electrochemical actuator, according to claim 1, wherein said moveable means includes a bellows.

9. An electrochemical actuator, according to claim 1, wherein said moveable means includes a bladder.

10. A micro-miniaturized electrochemical actuator valve mechanism, comprising:

a housing defining an interior chamber having an upper portion and a lower portion;

semi-solid electrolyte means hermetically sealed within said upper portion of said interior chamber for facilitating the conduction of current;

electrode means extending through said housing and at least partially into said interior chamber for contacting in electrical communication said electrolyte means;

digital semiconductor means for controlling the timing, duration, frequency and amount of current flowing to said electrode means;

inlet means defining a valve seat, disposed on said lower portion of said interior chamber for permitting fluid communication between said lower portion of said interior chamber and the outside environment;

outlet means disposed on said lower portion of said interior chamber for permitting fluid communication between said lower portion of said interior chamber and the outside environment; and moveable means disposed within said interior chamber for facilitating actuation, whereby when current is passed between said electrode means, as directed by said controlling means, a gas is liberated from said electrolyte means increasing the pressure applied to said moveable means by said electrolyte means, and causing said moveable means to move toward said valve seat until said moveable means contacts said valve seat thereby closing off the valve.

11. An electrochemical valve mechanism according to claim 10, wherein said moveable means includes a diaphragm.

12. A micro-miniaturized electrochemical actuator push/pull mechanism, comprising:

a frame defining two or more interior chambers;

semisolid electrolyte means hermetically sealed within said interior chamber for facilitating the conduction of current;

electrode means extending through said frame and at least partially into said interior chamber for contacting in electrical communication said electrolyte means;

digital semiconductor means for controlling the timing, duration, frequency and amount of current flowing to said electrode means; and at least two moveable means disposed within said interior chambers for facilitating actuation, whereby when current is passed between said electrode means, as directed by said controlling means, a gas is liberated from said electrolyte means increasing the pressure applied to said moveable means by said electrolyte means, and causing said moveable means to simultaneously move toward or away from each other.

13. An electrochemical actuator push/pull mechanism according to claim 12, wherein said moveable means includes one or more pistons.

14. A micro-miniaturized electrochemical actuator isolated from thermally hostile environments, comprising:

a housing defining an interior chamber;

semi-solid electrolyte means hermetically sealed within said interior chamber for facilitating the conduction of current;

electrode means extending through said housing and at least partially into said interior chamber for contacting in electrical communication said electrolyte means;

digital semiconductor means for controlling the timing, duration, frequency and amount of current flowing to said electrode means;

moveable means disposed at least partially within said interior chamber for facilitating actuation, whereby when current is passed between said electrode means, as directed by said controlling means, a gas is liberated from said electrolyte means increasing the pressure applied to said moveable means by said electrolyte means, and causing said moveable means to move; and means for transmitting the force of said moveable means when in motion to a remote location for actuation within a thermally hostile environment.

15. An electrochemical actuator isolated from thermally hostile environments according to claim 14, wherein said moveable means includes a diaphragm.

16. An electrochemical actuator isolated from thermally hostile environments according to claim 14, wherein said means for transmitting the force of said moveable means when in motion to a remote location for actuation within a thermally hostile environment includes hydraulic lines.

* * * * *